(12) United States Patent
Yamada et al.

(10) Patent No.: US 9,343,719 B2
(45) Date of Patent: May 17, 2016

(54) METHOD FOR PRODUCING LAMINATED POROUS FILM, AND LAMINATED POROUS FILM

(71) Applicant: Mitsubishi Plastics, Inc., Chiyoda-ku (JP)

(72) Inventors: Hiroto Yamada, Nagahama (JP); Tomoyuki Nemoto, Nagahama (JP)

(73) Assignee: MITSUBISHI PLASTICS, INC., Chiyoda-ku (JP)

( * ) Notice: Subject to any disclaimer, the term of this patent is extended or adjusted under 35 U.S.C. 154(b) by 0 days.

(21) Appl. No.: 14/346,565

(22) PCT Filed: Sep. 18, 2012

(86) PCT No.: PCT/JP2012/073840
§ 371 (c)(1),
(2) Date: Mar. 21, 2014

(87) PCT Pub. No.: WO2013/042661
PCT Pub. Date: Mar. 28, 2013

(65) Prior Publication Data
US 2014/0234538 A1    Aug. 21, 2014

(30) Foreign Application Priority Data

Sep. 22, 2011  (JP) ................... 2011-206677

(51) Int. Cl.
*B05D 3/02* (2006.01)
*H01M 2/14* (2006.01)
(Continued)

(52) U.S. Cl.
CPC .............. *H01M 2/145* (2013.01); *B29C 47/00* (2013.01); *B32B 27/08* (2013.01); *B32B 27/32* (2013.01);
(Continued)

(58) Field of Classification Search
CPC ............ H01M 2/145; H01M 2220/30; H01M 2/1646; H01M 2/1653; H01M 2/1686; H01M 10/052; H01M 10/4235; B05D 3/02; B05D 2201/04; B32B 27/32; B32B 27/08; B32B 2250/24; B32B 2255/10; B32B 2255/26; B32B 2307/518; B32B 2307/704; B32B 2307/724; B32B 2457/10; B29C 47/00; C09D 1/00
USPC ....................................... 427/393.5
See application file for complete search history.

(56) References Cited

U.S. PATENT DOCUMENTS

| | | |
|---|---|---|
| 5,948,464 A | 9/1999 | Delnick |
| 2007/0099072 A1 | 5/2007 | Hennige et al. |
| 2013/0034769 A1* | 2/2013 | Takagi et al. ............... 429/144 |

FOREIGN PATENT DOCUMENTS

| | | |
|---|---|---|
| CN | 101877422 | 11/2010 |
| JP | 10-106530 | 4/1998 |

(Continued)

OTHER PUBLICATIONS

English machine translation of the disclosure of CN 101877422.*
(Continued)

*Primary Examiner* — Robert S Walters, Jr.
(74) *Attorney, Agent, or Firm* — Oblon, McClelland, Maier & Neustadt, L.L.P.

(57) ABSTRACT

The present invention produces a laminated porous film which improves the stability of an aqueous dispersion of a metal oxide without lowering battery characteristics, while having high binding properties and excellent heat resistance. This laminated porous film exhibits excellent characteristics when used as a separator for batteries. This laminated porous film is produced by forming a porous coating layer on at least one outer surface of a resin porous film, which is formed of a single layer or a laminate of a plurality of layers, by applying a coating liquid that contains a metal oxide, a resin binder and a volatile acid thereto and drying the applied coating liquid. The coating liquid is prepared so that the difference between the pH ($pH_1$) of the coating liquid and the pH ($pH_2$) of the coating layer is not less than 2.

13 Claims, 3 Drawing Sheets

(51) Int. Cl.
   *B32B 27/32*   (2006.01)
   *H01M 2/16*    (2006.01)
   *H01M 10/42*   (2006.01)
   *B29C 47/00*   (2006.01)
   *B32B 27/08*   (2006.01)
   *C09D 1/00*    (2006.01)
   *H01M 10/052*  (2010.01)

(52) U.S. Cl.
   CPC ............. *C09D 1/00* (2013.01); *H01M 2/1646* (2013.01); *H01M 2/1653* (2013.01); *H01M 2/1686* (2013.01); *H01M 10/4235* (2013.01); *B32B 2250/24* (2013.01); *B32B 2255/10* (2013.01); *B32B 2255/26* (2013.01); *B32B 2307/518* (2013.01); *B32B 2307/704* (2013.01); *B32B 2307/724* (2013.01); *B32B 2457/10* (2013.01); *H01M 10/052* (2013.01); *H01M 2220/30* (2013.01)

(56) References Cited

FOREIGN PATENT DOCUMENTS

| | | |
|---|---|---|
| JP | 2004-227972 | 8/2004 |
| JP | 2006-289657 | 10/2006 |
| JP | 2007-509464 | 4/2007 |
| JP | 2008-149986 | 7/2008 |
| JP | 2008-186721 | 8/2008 |
| JP | 2010-123383 | 6/2010 |
| JP | 2010-195899 | 9/2010 |
| JP | 2011-832 | 1/2011 |
| JP | 2011-18588 | 1/2011 |
| JP | 2011-126275 | 6/2011 |
| WO | WO 2011132533 A1 * 10/2011 | ............. B32B 27/32 |

OTHER PUBLICATIONS

U.S. Appl. No. 14/817,785, filed Aug. 4, 2015, Yamada, et al.
U.S. Appl. No. 14/768,573, filed Aug. 18, 2015, Yamada, et al.

* cited by examiner (A)

(B)

METHOD FOR PRODUCING LAMINATED POROUS FILM, AND LAMINATED POROUS FILM

CROSS REFERENCE TO RELATED APPLICATIONS

The present application is a 35 U.S.C. §371 national stage patent application of International patent application PCT/JP2012/073840, filed on Sep. 18, 2012, published as WO/2013/042661 on Mar. 28, 2013, the text of which is incorporated by reference, and claims the benefit of the filing date of Japanese application no. 2011-206677, filed on Sep. 22, 2011, the text of which is also incorporated by reference.

TECHNICAL FIELD

The present invention relates to a method of producing a laminated porous film and the laminated porous film. The method can be utilized as methods of producing packing, hygiene, livestock, agricultural, building, and medical materials, and a separation film, a light diffusing plate, and a separator for a battery. More particularly the method of the present invention can be preferably utilized as a method of producing a separator for a nonaqueous electrolytic solution battery.

BACKGROUND ART

A polymeric porous material having a large number of intercommunicable micropores is utilized in various fields, for example, as separation films to be used to produce ultra-pure water, purify chemicals, and treat water; a waterproof moisture-permeable film to be used for clothes and sanitary materials; and the separator for use in the battery.

A secondary battery is widely used as the power source of OA, FA, household appliances, and portable apparatuses such as communication instruments. A lithium-ion secondary battery has a favorable volumetric efficiency when it is mounted on apparatuses and allows the apparatuses to be compact and lightweight. Therefore there is an increase in the use of portable devices in which the lithium-ion secondary battery is used. Owing to research and development of a large secondary battery which has been made in the field of load leveling, UPS, an electric car, and in many fields relating to the problem of energy and environment, the lithium-ion secondary battery which is a kind of a nonaqueous electrolytic solution secondary battery has widely spread in its use because the lithium-ion secondary battery has a large capacity, a high output, a high voltage, and an excellent long-term storage stability.

The lithium-ion secondary battery is so designed that the upper limit of the working voltage thereof is usually 4.1V to 4.2V. Because electrolysis occurs in an aqueous solution at such a high voltage, the aqueous solution cannot be used as an electrolyte. Therefore as an electrolytic solution capable of withstanding a high voltage, a so-called nonaqueous electrolytic solution in which an organic solvent is used is adopted. As a solvent for the nonaqueous electrolytic solution, an organic solvent having a high permittivity which allows a large number of lithium ions to be present is widely used. An organic carbonate ester compound such as propylene carbonate or ethylene carbonate is mainly used as the organic solvent having a high permittivity. As a supporting electrolyte serving as the ion source of the lithium ion in the solvent, an electrolyte having a high reactivity such as lithium phosphate hexafluoride is used in the solvent by dissolving it therein.

The separator is interposed between the positive electrode of the lithium-ion secondary battery and its negative electrode to prevent an internal short circuit from occurring. Needless to say, the separator is demanded to have insulating performance as its role. In addition the separator is required to have a porous structure so that air permeability of allowing lithium ions to pass therethrough and a function of diffusing and holding the electrolytic solution are imparted to the separator. To satisfy these demands, a porous film is used for the separator.

Because batteries having a high capacity are used recently, the degree of importance for the safety of the battery has increased. A shut-down property (hereinafter referred to as SD property) contributes to the safety of the separator for the battery. The SD property is the function of preventing the temperature inside the battery from rising owing to closing of micropores when the battery has a high temperature of 100° C. to 150° C., which leads to shut-off of ion conduction inside the battery off. The lowest temperature of temperatures at which the micropores of a laminated porous film are closed is called a shut-down temperature (hereinafter referred to as SD temperature). To use the laminated porous film as the separator for the battery, it is necessary for the laminated porous film to have the SD property.

Because the lithium-ion secondary battery has become higher in its energy density and power in recent years, the normal shut-down property does not sufficiently work. Thus the temperature inside the battery rises over 130° C. which is the melting point of polyethylene and continues to rise. Thus there is a fear that a short circuit occurs between the positive and negative electrodes owing to breakage of the separator caused by thermal contraction. Thus to secure safety, the separator is demanded to have a higher degree of heat resistance than the degree of heat resistance to be obtained by the present SD property.

To comply with the above-described demand, there are proposed the multilayered porous films each having the porous layer, containing the metal oxide and the resin binder, which is laminated on at least one surface of the porous polyolefin resin film (patent documents 1, 2, and 3). It is described in these patent documents that the methods of producing the multilayered porous films are excellent in safety because in these multilayered porous films, by forming the coating layer containing the metal oxide such as α alumina at a high content rate on the porous film, it is possible to prevent the occurrence of a short circuit between the positive and negative electrodes, even though abnormal heat is generated and the temperature of a battery continues to rise over the SD temperature.

PRIOR ART DOCUMENT

Patent Document

Patent document 1: Japanese Patent Application Laid-Open Publication No. 2004-227972

Patent document 2: Japanese Patent Application Laid-Open Publication No. 2008-186721

Patent document 3: International Patent Application Laid-Open No. 2008/149986

SUMMARY OF THE INVENTION

Problems to be Solved by the Invention

In the production methods described in the patent documents 1 through 3, to secure a high air permeable property, it is necessary to decrease the content of the resin binder of the porous layer containing the metal oxide and increase particle diameters of the metal oxide. But in that case, the production methods have a problem that a binding performance between the metal oxides deteriorates and thus the metal oxide particles are liable to fall off.

The production methods described in the patent documents 1 through 3 have another problem that the aqueous dispersion for the metal oxide has a low stability and thus the metal oxide agglomerates immediately. To improve the problem, it is necessary to add a dispersing agent, pH control chemicals, and the like to the aqueous dispersion. But the addition of these agents has a problem that additives which remain deteriorate the properties of a battery and that the amount of the dispersing agent has to be limited to secure high air-permeable performance.

More specifically, although the stability of the aqueous dispersion can be achieved by adding basic particles thereto, there is a possibility that heat of reaction and a gas are generated as a result of an acid-base reaction and basic active particles remain in the aqueous dispersion. Thus the treatment process is complicated.

The present invention has been developed to solve the above-described problems. Therefore it is an object of the present invention to provide a method of producing a laminated porous film which has been improved in stability in an aqueous dispersion for the metal oxide and in addition has high binding performance and excellent heat resistance so that in using the laminated porous film as a separator for a battery, the properties of the battery do not deteriorate. It is another object of the present invention to provide the laminated porous film.

Means for Solving the Problem

To solve the above-described problems, the first invention provides a method of producing a laminated porous film including a porous coating layer formed on a porous resin film consisting of a single layer or a laminate of a plurality of layers by applying a coating solution containing a metal oxide, a resin binder, and a volatile acid to at least one outer surface of the porous resin film and drying the coating solution. A pH ($pH_1$) of the coating solution is so adjusted that a difference between the pH ($pH_1$) of the coating solution and a pH ($pH_2$) of the coating layer is not less than 2.

In the present invention, it is preferable that at least one layer of the porous resin film is a porous polyolefin resin film.

In the present invention, it is preferable to set the $pH_1$ of the coating solution to pH1 to pH5.

In the present invention, it is preferable to set the $pH_2$ of the coating layer to pH5 to pH8.

In the present invention, it is preferable that a boiling point of the volatile acid or a decomposition temperature thereof is −100° C. to 150° C.

In the present invention, it is preferable that the volatile acid includes at least one kind selected from among a group of carbonic acid, formic acid, acetic acid, propionic acid, acrylic acid, nitric acid, nitrous acid, halogen oxoacids, hydrosulfuric acid, sulfurous acid, and hydrohalogenic acid.

In the present invention, it is preferable that the volatile acid is contained in the coating solution at 0.001 to 1 mass % for 100 mass % of the coating solution.

In the present invention, it is preferable that the metal oxide is alumina.

In the present invention, it is preferable that an average particle diameter of the metal oxide is 0.1 µm to 3.0 µm.

In the present invention, it is preferable that the resin binder includes at least one kind selected from among polyether, polyamide, polyimide, polyamide imide, polyaramid, polyvinyl alcohol, cyanoethyl polyvinyl alcohol, polyvinyl pyrrolidone, polyacrylonitrile, polytetrafluoroethylene, polyvinylidene fluoride, polyvinylidene fluoride-hexafluoropropylene, polyvinylidene fluoride-trichloroethylene, polymethyl methacrylate, polyacrylamide, polyvinyl acetate, ethylene vinyl acetate copolymer, poly(4-methyl-1-pentene), cyanoethyl cellulose, polyacrylic acid derivatives, polymethacrylic acid derivatives, and acid-modified polyolefin.

In the present invention, it is preferable that components contained in the coating solution are dispersed with a dispersion medium containing water as a main component thereof.

In the present invention, it is preferable that the pH of the coating solution is adjusted by selection of the volatile acid and a mixing ratio thereof.

In the present invention, it is preferable that the porous polyolefin resin film has a β crystal activity.

The second invention provides a laminated porous film including a porous resin film consisting of a single layer or a laminate of a plurality of layers and a coating layer formed on at least one outer surface of the porous resin film. The coating layer contains a metal oxide, a resin binder, and a metal salt compound resulting from a reaction between an impurity metal contained in the metal oxide and a volatile acid. A contraction coefficient in a length direction of the laminated porous film and in a width direction thereof is set to less than 10%.

It is preferable to produce the laminated porous film of the present invention by using the production method of the first invention.

In the present invention, it is preferable to set a rate of the metal oxide contained in the coating layer to 92 to 99 mass % and a rate of the resin binder contained in the coating layer to 8 to 1 mass %.

It is preferable to set a peel-off strength between the coating layer and the porous resin film to not less than 1N/15 mm.

The present invention provides a separator, for a battery, which comprises the laminated porous film.

The present invention provides a battery accommodating the separator for the battery.

Effect of the Invention

According to the present invention, in the coating layer to be formed by applying the coating solution containing the metal oxide and thereafter drying it, the pH of the coating solution is adjusted to restrain the metal oxide from agglomerating in dispersing the metal oxide in the coating solution. Thus it is possible to prevent particles of the metal oxide from falling off the formed coating layer. Therefore the coating layer has a high binding property and excellent heat resistance. Thereby the laminated porous film including the coating layer can be suitably utilized as a separator for a battery owing to its excellent properties.

MODE FOR CARRYING OUT THE INVENTION

Figure 1:
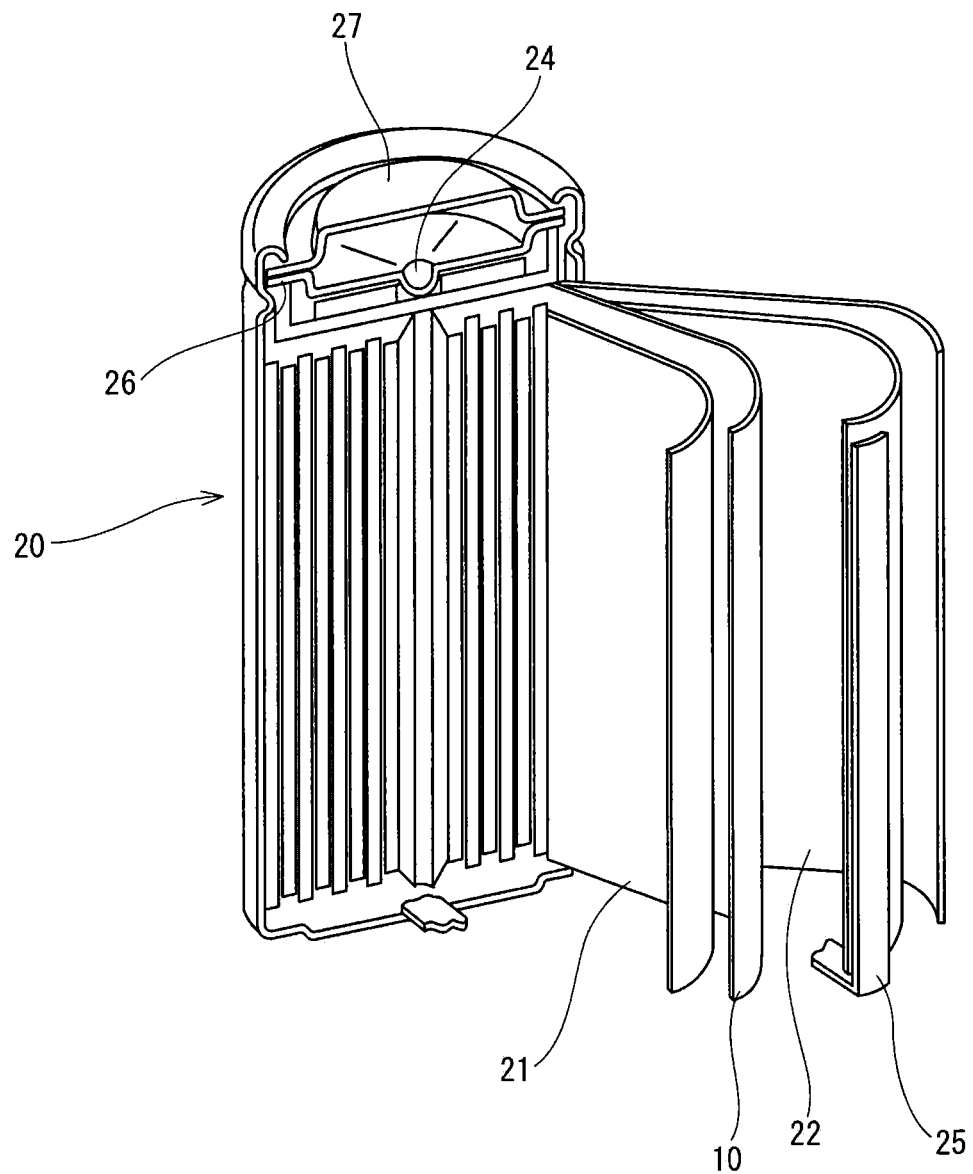
FIG. 1 is a schematic sectional view of a battery accommodating a laminated porous film of the present invention.

The embodiments of the laminated porous film of the present invention are described in detail below.

In the present invention, unless specifically described, the expression of "main component" includes a case in which a resin composition contains components other than the main component in a range where the function of the main component is not inhibited. Although the content rate of the main component is not specified, the expression of "main component" also means that the main component is contained in the resin composition at not less than 50 mass %, favorably not less than 70 mass %, and especially favorably not less than 90 mass % (including 100%).

Unless otherwise described, the description of "X to Y" (X, Y are any numerals) means "not less than X nor more than Y" and also includes meaning "preferably larger than X" and "preferably smaller than Y".

The laminated porous film of the present invention has a base layer (layer I) consisting of a porous resin film consisting of a single layer or a plurality of layers laminated one upon another and a coating layer (layer II) formed on at least one outer surface of the base layer (layer I). The laminated porous film has intercommunicable pores intercommunicating with the base layer (layer I) and the coating layer (layer II) formed on the surface and inside thereof and thus has an air-permeable property.

Components composing the laminated porous film of the present invention are described below.

<Porous Resin Film>

The resin composing the porous resin film constituting the base layer is not limited to a specific one, but it is possible to adopt various resins such as polyolefin resin, polyester resin, polystyrene resin, polyamide resin, polyurethane resin, polycarbonate resin, and the like.

The method of producing the porous resin film (layer I) by using these resins is not limited to a specific one, but it is possible to adopt various production methods such as a method of obtaining the porous resin film as nonwoven cloth, a method of making an unporous membrane material obtained by using various production methods porous by stretching it or by foaming it, a method of making the unporous membrane material porous by extracting a solvent, and a method of making the unporous membrane material porous by physically perforating it.

In the present invention, it is especially preferable to use a porous polyolefin resin film composed of the polyolefin resin from the standpoint that the porous polyolefin resin film is chemically stable and hardly corrodes.

(Porous Polyolefin Resin Film)

As the polyolefin resin to be used for the porous polyolefin resin film, homopolymers or copolymers consisting of polymerized α-olefin such as ethylene, propylene, 1-butene, 4-methyl-1-pentene, 1-hexane, and the like are listed. It is possible to mix not less than two kinds of these homopolymers or copolymers with each other. Of these polyolefin resins, it is preferable to use polypropylene resin or polyethylene resin. It is especially preferable to use the polypropylene resin from the standpoint of maintaining the mechanical strength and heat resistance of the laminated porous film of the present invention.

As the polypropylene resin to be used in the present invention, homo-polypropylene (propylene homopolymer) or random copolymers or block copolymers consisting of propylene and the α-olefin such as ethylene, 1-butene, 1-pentene, 1-hexene, 1-heptene, 1-octene, 1-nonen or 1-decene are listed. Of the above-described polypropylene resins, the homo-polypropylene can be used more favorably from the standpoint that it is capable of maintaining the mechanical strength and heat resistance of the laminated porous film.

It is favorable to use the polypropylene resin in which an isotactic pentad fraction (mmmm fraction) showing tacticity is 80 to 99%. It is more favorable to use the polypropylene resin in which the isotactic structure pentad fraction is 83 to 98% and most favorable to use the polypropylene resin in which the isotactic structure pentad fraction at 85 to 97%. When the isotactic pentad fraction is too low, there is a fear that the mechanical strength of the film is low. On the other hand, the upper limit of the isotactic pentad fraction is specified by the upper limit value industrially obtained at the present time. But in the case where a resin having a higher regularity at an industrial level is developed in the future, there is a possibility that the upper limit of the isotactic pentad fraction is altered. The isotactic pentad fraction (mmmm fraction) means a three-dimensional structure in which all of five methyl groups which are side chains branched from a main chain consisting of a carbon-carbon bond composed of arbitrary continuous five propylene units are positioned in the same direction with respect to the main chain or the ratio of the side chains positioned in the same direction with respect to the main chain. The attribution of a signal in a methyl group region complies with A. Zambelli et al (Marcomolecules 8, 687, (1975)).

It is favorable that Mw/Mn which is a parameter showing the molecular-weight distribution of the polypropylene resin is 2.0 to 10.0. It is more favorable to use the polypropylene resin having the Mw/Mn of 2.0 to 8.0 and most favorable to use the polypropylene resin having the Mw/Mn of 2.0 to 6.0. The smaller is the Mw/Mn, the narrower is the molecular-weight distribution. When the Mw/Mn is less than 2.0, there occurs a problem that extrusion moldability is low, and in addition it is difficult to industrially produce the polypropylene resin. On the other hand, when the Mw/Mn exceeds 10.0, the amount of a low molecular-weight component becomes large. Thereby the mechanical strength of the laminated porous film is liable to be low. The Mw/Mn is obtained by a GPC (gel permeation chromatography) method.

Although the melt flow rate (MFR) of the polypropylene resin is not limited to a specific value, normally, the MFR thereof is set to favorably 0.5 to 15 g/10 minutes and more favorably 1.0 to 10 g/10 minutes. By setting the MFR to not less than 0.5 g/10 minutes, the melt viscosity of the resin is high at a molding processing time and thus a sufficient productivity can be securely obtained. On the other hand, by setting the MFR to not more than 15 g/10 minutes, it is possible to sufficiently hold the mechanical strength of the laminated porous film to be obtained. The MFR is measured in accordance with JIS K7210 in a condition where temperature is 230° C. and a load is 2.16 kg.

The method of producing the polypropylene resin is not limited to a specific one, but it is possible to exemplify known polymerization methods in which a known olefin polymerization catalyst is used. It is possible to exemplify slurry polymerization, a melt polymerization method, a bulk polymerization method, and a gas phase polymerization method in which a multi-site catalyst represented by a Ziegler-Natta type catalyst and a single-site catalyst represented by a Metallocene catalyst are used, and a bulk polymerization method in which a radical initiator is used.

As the polypropylene resin, it is possible to use commercially available products having the following trade names: such as "Novatec PP" and "WINTEC" (produced by Japan Polypropylene Corporation), "Notio", "TAFMERXR" (producedbyMitsui Chemicals, Inc.), "Zerasu" and "Thermorun" (produced by Mitsubishi Chemical Corporation), "Sumitomo NOBLEN" and "Toughseren" (produced by Sumitomo Chemical Co., Ltd.), "Prime Polypro" and "Prime TPO" (produced by Prime Polymer Corporation), "AdfleX", "Adsyl", and "HMS-PP (PF814)" (produced by SunAllomer Ltd.), and "VERSIFY" and "Inspire" (produced by Dow Chemical Company).

In the case where the polyethylene resin is used for the porous polyethylene resin film (layer I), it is possible to list copolymers containing low-density polyethylene, linear low-density polyethylene, linear-ultra-low-density polyethylene, medium-density polyethylene, high-density polyethylene or ethylene as the main component thereof. That is, it is possible to list copolymers or multi-component copolymers consisting of ethylene and one kind or not less than two kinds of comonomers selected from among α-olefin whose carbon number is 3 to 10 such as propylene, butene-1, pentene-1, hexen-1, heptene-1, and oxtene-1; vinyl ester such as vinyl acetate and vinyl propionate; unsaturated carboxylates such as methyl acrylate, ethyl acrylate, methyl methacrylate, and ethyl methacrylate; and unsaturated compounds such as conjugated diene and non-conjugated diene or mixed compositions of the above-described copolymers or multi-component copolymers. The content of the ethylene unit of the ethylene polymer normally exceeds 50 mass %.

Of these polyethylene resins, at least one kind of polyethylene resin selected from among low-density polyethylene, linear low-density polyethylene, and high-density polyethylene is favorable. The high-density polyethylene is more favorable.

The density of the polyethylene resin is set to favorably 0.910 to 0.970 g/cm$^3$, more favorably 0.930 to 0.970 g/cm$^3$, and most favorably 0.940 to 0.970 g/cm$^3$. When the density thereof is not less than 0.910 g/cm$^3$, the polyethylene resin is capable of having a proper SD property, which is preferable. When the density thereof is not more than 0.970 g/cm$^3$, the polyethylene resin is capable of having the proper SD property, and in addition stretch property thereof is maintained, which is preferable.

The density thereof can be measured in accordance with JIS K7112 by using a density gradient tube method.

Although the melt flow rate (MFR) of the polyethylene resin is not specifically limited, MFR thereof is favorably 0.03 to 30 g/10 minutes and more favorably 0.3 to 10 g/10 minutes. When the MFR is not less than 0.03 g/10 minutes, the melt viscosity of the resin is sufficiently low at a molding processing time, and thus productivity is excellent, which is preferable. On the other hand, when the MFR is not more than 30 g/10 minutes, the polyethylene resin is capable of obtaining a sufficient mechanical strength, which is preferable.

The MFR is measured in accordance with JIS K7210 in the condition where temperature is 190° C. and a load is 2.16 kg.

The method of producing the polyethylene resin is not limited to a specific one, but it is possible to exemplify known polymerization methods in which known olefin polymerization catalysts are used. It is possible to exemplify polymerization methods in which the multi-site catalyst represented by the Ziegler-Natta type catalyst and the single-site catalyst represented by the Metallocene catalyst are used. As methods of polymerizing the polyethylene resin, it is possible to use one-step polymerization, two-step polymerization, and multi-step polymerization. It is possible to use the polyethylene resin produced by any of the above-described polymerization methods.

It is preferable that the porous polyolefin resin film constituting the base layer of the laminated porous film of the present invention has a β crystal activity. The β crystal activity can be considered as an index indicating that a β crystal has been generated in a membrane material before the membrane material is stretched. When the β crystal is generated in the membrane material before the membrane material is stretched, micropores are easily formed by stretching the membrane material even in a case where an additive such as a filler is not used. Thereby it is possible to obtain the laminated porous film having an air-permeable characteristic.

Whether the laminated porous film of the present invention has the "β crystal activity" is determined according to whether a crystalline melting peak temperature derived from the β crystal is detected by using a differential scanning calorimeter and/or according to whether a diffraction peak derived from the β crystal is detected by measurement conducted by using an X-ray diffraction measuring apparatus to be described later.

In the laminated porous film of the present invention, a case in which the polyolefin resin composing the base layer (layer I) is the polypropylene resin is exemplified below.

To determine whether the laminated porous film of the present invention has the "β crystal activity", after the temperature of the laminated porous film is raised from 25° C. to 240° C. at a heating speed of 10° C./minute, the laminated porous film is allowed to stand for one minute. After the temperature of the laminated porous film is dropped from 240° C. to 25° C. at a cooling speed of 10° C./minute, the laminated porous film is allowed to stand for one minute. Thereafter the temperature of the laminated porous film is raised again from 25° C. to 240° C. at the heating speed of 10° C./minute. In the case where a crystalline melting peak temperature (Tmβ) derived from the β crystal of the polypropylene resin is detected at this time, it is determined that the laminated porous film has the β crystal activity.

The degree of the β crystal activity of the laminated porous film is computed based on an equation shown below by using a detected crystalline melting heat amount (ΔHmα) derived from an α crystal of the polypropylene resin and a detected crystalline melting heat amount (ΔHmβ) derived from the β crystal thereof.

$$\beta \text{ crystal activity degree (\%)} = [\Delta Hm\beta/(\Delta Hm\beta + \Delta Hm\alpha)] \times 100$$

For example, in the case where the polypropylene resin is the homopolypropylene, the β crystal activity degree can be computed from the crystalline melting heat amount (ΔHmβ), derived from the β crystal, which is detected mainly in a range not less than 145° C. and less than 160° C. and from the crystalline melting heat amount (ΔHmα), derived from the α crystal, which is detected mainly in a range not less than 160° C. nor more than 170° C. In the case where the polypropylene resin is a random polypropylene in which 1 to 4 mol % of ethylene is copolymerized, the β crystal activity degree can be computed from the crystalline melting heat amount (ΔHmβ), derived from the β crystal, which is detected mainly in a range not less than 120° C. and less than 140° C. and from the crystalline melting heat amount (ΔHmα), derived from the α crystal, which is detected mainly in a range not less than 140° C. nor more than 165° C.

It is preferable that the porous polyolefin resin film has a possible highest β crystal activity degree. More specifically, the β crystal activity degree is favorably not less than 20%, more favorably not less than 40%, and especially favorably not less than 60%. When the laminated porous film has the β crystal activity degree not less than 20%, it is possible to generate a large number of the β crystal of the polypropylene resin in the unstretched membrane material, and in addition, a large number of pores fine and homogeneous is formed by stretching the unstretched membrane material. Consequently it is possible to use laminated porous film as a separator, for a battery, which has a high mechanical strength and an excellent air-permeable performance.

Although the upper limit value of the β crystal activity degree is not limited to a specific value, the higher the β crystal activity degree is, the more effectively the above-described effect can be obtained. Therefore it is preferable that the upper limit of the β crystal activity degree is as close to 100% as possible.

Whether the laminated porous film has the β crystal activity can be also determined based on a diffraction profile to be obtained by conducting wide-angle X-ray diffraction measurement of the laminated porous film subjected to specific heat treatment.

In detail, after the porous polyolefin resin film is thermally treated at 170° C. to 190° C. higher than the melting point of the polypropylene resin, the wide-angle X-ray measurement is conducted on the laminated porous film in which the β crystal has been generated and grown by gradually cooling it. In the case where a diffraction peak derived from a (300) plane of the β crystal of the polypropylene resin is detected in a range of $2\theta=16.0°$ to $16.5°$, it is determined that the porous polyolefin resin film has the β crystal activity.

Regarding the detail of the β crystal structure of the polypropylene resin and the wide-angle X-ray diffraction thereof, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and reference documents listed in these documents. The method of evaluating the β crystal activity by using the wide-angle X-ray diffraction is shown in detail in the examples of the present invention to be described later.

The β crystal activity of the laminated porous film of the present invention can be measured in the form of a laminate of a plurality of all layers.

It is preferable that in the case where the porous resin film (layer I) is composed of a laminate of a layer consisting of the polyethylene resin and the polypropylene resin and a layer consisting of the polypropylene resin, both layers have the β crystal activity.

Examples of methods of obtaining the β crystal activity include a method of not adding a substance accelerating the generation of the α crystal of the polypropylene resin to the resin composition, the method of adding the polypropylene treated to generate the peroxide radical to the resin composition, as described in U.S. Pat. No. 3,739,481, and the method of adding a β crystal nucleating agent to the resin composition are exemplified.

As the β crystal nucleating agents to be used in the present invention, those shown below are listed. It is possible to use any β crystal nucleating agent which enhances the generation and growth of the β crystal of the polypropylene resin. The β crystal nucleating agent can be used by mixing not less than two kinds with each other.

As the β crystal nucleating agent, it is possible to list amide compounds; tetraoxaspiro compounds; quinacridones; iron oxides having a nano-scale size; alkaline metal salts or alkaline earth metal salts of carboxylic acids represented by 1,2-potassium hydroxystearate, magnesium benzoate, magnesium succinate, and magnesium phthalate; aromatic sulfonic acid compounds represented by sodium benzensulfonate and sodium naphthalene sulfonate; diesters or triesters of dibasic or tribasic carboxylic acids; phthalocyanine-based pigments represented by phthalocyanine blue; two-component compounds composed of a component A which is an organic dibasic acid and a component B which is an oxide, a hydroxide or a salt of one of the group IIA metals of the Periodic Table; and compositions consisting of a cyclic phosphorous compound and a magnesium compound. Other kinds of the β crystal nucleating agent are described in Japanese Patent Application Laid-Open Nos. 2003-306585, 06-289566, and 09-194650.

As products of the β crystal nucleating agent commercially available, "Enujesuta-NU-100" produced by New Japan Chemical Co., Ltd. is exemplified. As examples of the polypropylene resin to which the β crystal nucleating agent is added, it is possible to list Polypropylene "Bepol B-022SP" produced by Aristech Inc., Polypropylene "Beta (β)-PPBE60-7032" produced by Borealis Inc., and Polypropylene "BNX BETAPP-LN" produced by Mayzo Inc.

It is necessary to appropriately adjust the mixing ratio of the β crystal nucleating agent to be added to the polypropylene resin according to the kind of the β crystal nucleating agent and the composition of the polypropylene resin. It is favorable to add 0.0001 to 5.0 parts by mass of the β crystal nucleating agent, more favorable to add 0.001 to 3.0 parts by mass thereof, and most favorable to add 0.01 to 1.0 part by mass thereof to 100 parts by mass of the polypropylene resin. When the mixing ratio of the β crystal nucleating agent is not less than 0.0001 parts by mass, it is possible to generate and grow the β crystal of the polypropylene resin sufficiently at a production time and securely obtain a sufficient β crystal activity and a desired air-permeable characteristic in the case where the porous polyolefin resin film is used as the separator for the battery. When not more than 5.0 parts by mass of the β crystal nucleating agent is added to 100 parts by mass of the polypropylene resin, economic advantage can be obtained, and in addition, the β crystal nucleating agent is unlikely to bleed to the surface of the laminated porous film, which is preferable.

In the case where the layer containing the polypropylene resin is laminated on the layer consisting of the polypropylene resin, the addition amount of the β crystal nucleating agent of both layers may be equal to each other or different from each other. By differentiating the addition amount of the β crystal nucleating agent from each other, it is possible to appropriately adjust the porous structure of each layer.

In the present invention, in addition to the above-described components, additives to be normally added to the resin composition may be appropriately added to the polypropylene resin in a range in which they do not outstandingly inhibit the effect of the present invention. The additives are added to the polypropylene resin to improve and adjust molding processability, productivity, and various properties of the porous resin film (layer I). It is possible to list recycle resin which is generated from trimming loss such as a lug, inorganic particle such as silica, talc, kaolin, calcium carbonate, and the like, pigments such as carbon black, and the like, a flame retardant, a weathering stabilizer, a heat stabilizer, an antistatic agent, a melt viscosity improving agent, a crosslinking agent, a lubricant, a nucleating agent, plasticizer, an age resistor, an antioxidant, a light stabilizer, an ultraviolet ray absorber, a neutralizing agent, an antifog agent, an anti-blocking agent, a slip agent, and a coloring agent. To promote the formation of pores in the porous resin film and impart molding processability thereto, it is possible to add modified polyolefin resin, aliphatic saturated hydrocarbon resin or its modified substances, ethylene polymers, wax or low-molecular-weight polypropylene thereto in the range in which they do not outstandingly inhibit the effect of the present invention.

In the present invention, the porous resin film (layer I) may be composed of a single layer or a laminate of a plurality of layers. The layer structure thereof is not specifically limited. In the case where the porous resin film (layer I) consists of the porous polyolefin resin film, it is preferable to form the porous resin film as a single layer (hereinafter may be referred to as "layer A") containing the polyolefin resin or as a laminate of the layer A and another layer (hereinafter may be referred to as "layer B") in a range in which the layer B does not inhibit the function of the layer A. In the case where the porous resin film is used as the separator for a nonaqueous electrolytic solution secondary battery, it is possible to laminate a resin layer having a low melting point in which pores close in a high-temperature atmosphere to secure the safety of the battery, as described in Japanese Patent Application Laid-Open Publication No. 04-181651.

It is possible to exemplify a two-layer structure composed of the layer A/the layer B laminated one upon another and a three-layer structure composed of the layer A/the layer B/the layer A or the layer B/the layer A/the layer B laminated one upon another. It is also possible to form a three-kind three-layer mode composed of the layers A and B and another layer, having a function other than the functions of the layers A and B, which is combined with the layers A and B. In this case, the order in which the layers A and B and another layer are laminated one upon another does not matter. It is also possible to increase the number of layers to four layers, five layers, six layers or seven layers as necessary.

The property of the porous resin film (layer I) to be used in the present invention can be freely adjusted according to a layer structure, a lamination ratio, the composition of each layer, and a production method.

(Method of Producing Porous Resin Film (Layer I))

As the method of producing the porous resin film (layer I) to be used in the present invention, the method of producing the porous polyolefin resin film is described below. The present invention is not limited to the porous polyolefin resin film to be produced by the production method described below.

The method of producing the unporous membrane material is not limited to a specific method, but known methods may be used. It is possible to exemplify a method of melting a polyolefin resin composition by using an extruder, extruding it from a T-die, and cooling it with a casting roll to solidify it and a method of cutting open a membrane material produced by using a tubular method to make it planar.

The method of making the unporous membrane material porous is not limited to a specific method, but it is possible to use known methods such as a method of stretching the unporous membrane material uniaxially or biaxially by using a wet process or a method of stretching the unporous membrane material uniaxially or biaxially by using a dry process. The method of stretching the unporous membrane material includes a roll stretching method, a rolling method, a tenter stretching method, and a simultaneous biaxial stretching method. Uniaxial stretching or biaxial stretching is performed by using one of the above-described methods or in combination of not less than two of the above-described methods. From the standpoint of the control of the porous structure, sequential biaxial stretching is preferable. As necessary, it is possible to adopt a method of extracting a plasticizer contained in the polyolefin resin composition with a solvent and drying the solvent before and after the unporous membrane material is stretched.

In the present invention, in the case where the porous polyolefin resin film is composed of a plurality of layers laminated one upon another, the method of producing the porous polyolefin resin film is classified into the following four according to the order of the step at which the unporous membrane material is made porous and the step at which layers are laminated one upon another.

(i) A method of making respective layers porous and thereafter laminating the layers which have been made porous one upon another or by using an adhesive agent or the like.

(ii) A method of forming a laminated unporous membrane material by laminating respective layers one upon another and thereafter making the unporous membrane material porous.

(iii) A method of making one of layers porous, laminating the layer which has been made porous and another layer one upon another, and making another layer porous.

(iv) A method of forming porous layers and thereafter coating them with inorganic or organic particles or evaporating metal particles thereto to form a laminated porous film.

In the present invention, it is preferable to use the method (ii) from the standpoint of the simplicity of its process and productivity. To secure the adhesion between two layers, it is especially preferable to form the laminated unporous membrane material by co-extrusion and thereafter make it porous.

The method of producing the porous polyolefin resin film is described in detail below.

Initially a mixed resin composition of the polypropylene resin, the thermoplastic resin, and additives is prepared. The thermoplastic resin and the additives are used as necessary. Preferably, materials such as the polypropylene resin, the $\beta$ nucleating agent, and the additives to be used as desired are mixed with one another by using a Henschel mixer, a super mixer or a tumbler-type mixer. Alternatively all the components are put in a bag and mixed with one another by hand. After the components are melted and kneaded with a uniaxial extruder, preferably a twin screw extruder or a kneader, a mixture is cut to obtain a pellet.

The pellet is supplied to the extruder and extruded from an extrusion mouthpiece of a T-die to form a membrane material. The kind of the T-die is not limited to a specific one. For example, when a two-kind three-layer structure is adopted for the porous polyolefin resin film to be used in the present invention, it is possible to use a multi-manifold type for the two-kind three-layer structure or a feed block type for the two-kind three-layer structure.

Although the gap in the T-die to be used is determined according to an ultimately necessary thickness of the film, a stretching condition, a draft ratio, and various conditions, the gap in the T-die is normally 0.1 to 3.0 mm and favorably 0.5 to 1.0 mm. It is unpreferable to set the gap in the T-die to less than 0.1 mm from the standpoint of a production speed. When the gap in the T-die is more than 3.0 mm, the draft ratio becomes large, which is unpreferable from the standpoint of stability in the production of the film.

Although the extrusion processing temperature in the extrusion molding is appropriately adjusted according to the flow property of the resin composition and the moldability thereof, the extrusion processing temperature is set to favorably 180 to 350° C., more favorably 200 to 330° C., and most favorably 220 to 300° C. When the extrusion processing temperature is not less than 180° C., the fused resin has a sufficiently low viscosity and thus an excellent moldability and an improved productivity. On the other hand, by setting the extrusion processing temperature to not more than 350° C., it is possible to restrain the resin composition from deteriorating and thus the mechanical strength of the laminated porous film to be obtained from lowering.

The temperature at which the resin composition is cooled to solidify it by using the casting roll is very important in the present invention. The ratio of the $\beta$ crystal of the polyolefin resin contained in the membrane material can be adjusted in dependence on temperature. The temperature at which the resin composition is cooled to solidify it by using the casting roll is set to favorably 80 to 150° C., more favorably 90 to 140° C., and most favorably 100 to 130° C. By setting the temperature at which the resin composition is cooled to solidify it to not less than 80° C., the ratio of the β crystal contained in the membrane material can be sufficiently increased, which is preferable. By setting the temperature at which the resin composition is cooled to solidify it to not more than 150° C., it is possible to restrain the occurrence of a trouble that extruded molten resin adheres to the casting roll and sticks thereto. Thus it is possible to efficiently process the resin composition into the membrane material, which is preferable.

By setting the temperature of the casting roll to the above-described temperature range, the ratio of the β crystal of the polyolefin resin of the unstretched membrane material is set to 30 to 100%, favorably to 40 to 100%, more favorably to 50 to 100%, and especially favorably to 60 to 100%. By setting the ratio of the β crystal of the unstretched membrane material to not less than 30%, it is easy to make the unstretched membrane material porous by a stretching operation to be performed at a later step. Thereby it is possible to obtain the porous polyolefin resin film having an excellent air-permeable property.

By using the differential scanning calorimeter, the rate of the β crystal of the polyolefin resin of the unstretched membrane material is computed based on the following equation by using the detected crystal melting heat amount ($\Delta Hm\alpha$) derived from the α crystal of the polyolefin resin and the crystal melting heat amount ($\Delta Hm\beta$) derived from the β crystal thereof, when the temperature of the membrane material is raised from 25° C. to 240° C. at a heating speed of 10° C./minute.

$$\text{Rate (\%) of } \beta \text{ crystal} = [\Delta Hm\beta/(\Delta Hm\beta + \Delta Hm\alpha)] \times 100$$

Thereafter the obtained unporous membrane material is stretched. As a stretching process, although the unporous membrane material may be uniaxially stretched, it is preferable to biaxially stretch it. In biaxially stretching the unporous membrane material, the simultaneous biaxial stretching or the sequential biaxial stretching may be performed. But the sequential biaxial stretching is more favorable than the simultaneous biaxial stretching because the sequential biaxial stretching allows stretching conditions (stretch ratio, temperature) to be easily selected at each stretching step and the porous structure to be easily controlled. The longitudinal direction of the membrane material and that of the film are called a "length direction", whereas a direction vertical to the longitudinal direction is called a "width direction". Stretching in the longitudinal direction is called "stretching in length-direction", whereas stretching in the direction vertical to the longitudinal direction is called "stretching in width direction".

In the case where the sequential biaxial stretching is used, it is necessary to vary the stretching temperature according to the composition, crystal melting peak temperature, and crystallization degree of the resin composition to be used. The stretching temperature in the stretching in the length direction is controlled in the range of favorably 0 to 130° C., more favorably 10 to 120° C., and most favorably 20 to 110° C. The stretch ratio in the length direction is set to favorably 2 to 10 times, more favorably 3 to 8 times, and most favorably 4 to 7 times longer than the original length of the unporous membrane material. By the stretching the unporous membrane material in the length direction within the above-described range, it is possible to restrain breakage at a stretching time and generate a proper starting point of pores.

On the other hand, the stretching temperature in the stretching in the width direction is set to 100 to 160° C., favorably 110 to 150° C., and most favorably 120 to 140° C. The stretch ratio in the length direction is set to favorably 1.2 to 10 times, more favorably 1.5 to 8 times, and most favorably 2 to 7 times longer than the original length of the unporous membrane material. By stretching the unporous membrane material in the width direction in the above-described range, it is possible to moderately enlarge the starting point of pores formed by the stretching in the length direction and generate a fine porous structure.

The stretching speed at the above-described stretching steps is set to favorably 500 to 12000%/minute, more favorably 1500 to 10000%/minute, and most favorably 2500 to 8000%/minute.

To improve the dimensional stability of the porous polyolefin resin film obtained in the above-described manner, it is preferable to heat-treat it. In the heat treatment, by setting the heat treatment temperature to favorably not less than 100° C., more favorably not less than 120° C., and most favorably not less than 140° C., it is possible to allow the porous polyolefin resin film to be stable in its dimension. On the other hand, the heat treatment temperature is set to favorably not more than 170° C., more favorably not more than 165° C., and most favorably not more than 160° C. By setting the heat treatment temperature to not more than 170° C., the polypropylene resin is unlikely to be melted by the heat treatment and thus the porous structure can be maintained, which is preferable. Relaxation treatment may be performed at 1 to 20% as necessary while the heat treatment step is being performed. By uniformly cooling the membrane material and winding it after it is heat-treated, the porous polyolefin resin film of the present invention is obtained.

<Coating Layer (Layer II)>

In the present invention, the coating layer (layer II) is laminated on the porous resin film (layer I) constituting the base layer by applying a coating solution containing a volatile acid (c) and a metal oxide (a) as the main component thereof to at least one surface of the porous resin film.

Examples of the metal oxide (a) which can be used in the present invention include magnesium oxide, alumina, tin oxide, titanium oxide, zinc oxide, calcium oxide, and zirconium oxide. Of these metal oxides, the alumina is more favorable than the other metal oxides because the alumina is chemically inert when the laminated porous film is incorporated in a battery in using it as the separator for the battery.

Examples of the alumina include α alumina, γ alumina, θ alumina, and pseudo-boehmite and in addition, surfaces-treated alumina. Although the alumina is not limited to specific kind, the α alumina and the surface-treated α alumina are preferable in that they have a small surface area and are unlikely to adsorb effective components in the battery when the laminated porous film is incorporated therein.

Regarding the lower limit of the average particle diameter of the metal oxide (a), the average particle diameter thereof is set to favorably not less than 0.1 μm, more favorably not less than 0.2 μm, and most favorably not less than 0.3 μm. On the other hand, regarding the upper limit of the average particle diameter of the metal oxide (a), the average particle diameter thereof is set to favorably not more than 3. 0pm and more favorably not more than 1.5 μm. By setting the average particle diameter of the metal oxide (a) to the above-described specified range, the coating layer (layer II) is allowed to have a sufficient heat resistance. By setting the average particle diameter thereof to not more than 1.5 μm, the coating layer (layer II) has excellent dispersibility, which is preferable.

In the embodiment, "Average particle diameter of metal oxide (a)" is measured in accordance with a method using SEM.

Examples of the resin binder (b) which can be used in the present invention include polyether, polyamide, polyimide, polyamide imide, polyaramid, polyvinyl alcohol, cyanoethyl polyvinyl alcohol, polyvinyl pyrrolidone, polyacrylonitrile, polytetrafluoroethylene, polyvinylidene fluoride, polyvinylidene fluoride-hexafluoropropylene, polyvinylidene fluoride-trichloroethylene, polymethyl methacrylate, polyacrylamide, polyvinyl acetate, ethylene vinyl acetate copolymer, poly(4-methyl-1-pentene), cyanoethyl cellulose, polyacrylic acid derivatives, polymethacrylic acid derivatives, and acid-modified polyolefin. It is preferable to use the resin binders (b) because favorable adhesion between the metal oxide (a) and the porous resin film (layer I) is obtained. Of these resin binders (b), the polyoxyethylene, the polyvinyl alcohol, the polyvinyl pyrrolidone, the polyacrylic acid derivatives, and maleic acid-modified polyolefin are more favorable because these resin binders (b) are comparatively stable in an acidic condition.

In the coating layer, the ratio of the content of the metal oxide (a) to the total of the amount of the metal oxide (a) and that of the resin binder (b) is set to favorably not less than 92 mass %, more favorably not less than 95 mass %, and most favorably not less than 98 mass %. When the content ratio of the metal oxide (a) is not less than 92 mass %, it is possible to produce the laminated porous film having a high degree of intercommunicable property. Thus it is possible to allow the laminated porous film to display excellent air-permeable performance, which is preferable.

Examples of the volatile acid (c) include acid gases such as carbonic acid, hydrogen sulfide, and sulfurous acid gas; lower carboxylic acids such as formic acid, acetic acid, propionic acid, and acrylic acid; nitro acids such as nitric acid and nitrous acid; halogen oxoacids such as perchloric acid and hypochlorous acid; hydrohalogenic acid such as hydrochloric acid, hydrofluoric acid, and hydrobromic acid. Of these volatile acids, the formic acid, the acetic acid, and the hydrochloric acid are preferable from the standpoint that by adding a small amount of these volatile acids to the coating solution, the pH of the coating solution can be decreased, that these volatile acids are easily commercially available, and that these volatile acids have a high stability.

The boiling point of the volatile acid (c) or its decomposition temperature is favorably –100 to 150° C. and more favorably –100 to 120° C. By setting the boiling point of the volatile acid (c) or its decomposition temperature to –100 to 150° C., the volatile acid (c) volatilizes sufficiently when the coating solution is dried and thus does not adversely affect the battery.

The volatile acid (c) is contained at favorably 0.001 to 1 mass %, more favorably 0.01 to 0.5 mass %, and most favorably 0.05 to 0.5 mass % for 100 mass % of the coating solution. In the case where the volatile acid (c) is contained at not less than 0.01 mass % for 100 mass % of the coating solution, the pH of the coating solution can be decreased to the predetermined pH. In the case where the volatile acid (c) is contained at not more than 1 mass % for 100 mass % of the coating solution, the volatile acid (c) is unlikely to remain on the porous polyolefin resin film (layer I). Thereby it is possible to restrain the properties the porous polyolefin resin film from deteriorating.

In the coating solution, the metal oxide (a), the resin binder (b), and the volatile acid (c) are dispersed with a dispersion medium. In the present invention, it is important that the metal oxide (a), the resin binder (b), and the volatile acid (c) are contained in the coating solution. The coating solution may contain additives such as a dispersing agent and a crosslinking agent as necessary.

As the dispersion medium for the coating solution, it is preferable to use a solvent in which the metal oxide (a), the resin binder (b), and the volatile acid (c) can be uniformly and stably dissolved or dispersed. As such a solvent, it is possible to list N-methyl pyrrolidone, N,N-dimethyl formaldehyde, N,N-dimethylacetamide, water, dioxane, acetonitrile, lower alcohol, glycols, glycerin, and lactate. Of these substances, it is preferable to use water in view of environmental load and the cost of the solvent.

To stabilize the coating solution or improve the performance of coating the surface of the porous resin film (layer I), various additives including a dispersing agent such as a surface-active agent, a thickener, a wetting agent, and an antifoam agent may be added to the coating solution. It is preferable to use the additives which can be removed from the coating solution when the dispersion medium is removed.

It is important to adjust the pH of the coating solution in such a way that the difference between the pH ($pH_1$) of the coating solution and the pH ($pH_2$) of the coating layer (layer II) formed by drying the coating solution is not less than two.

By setting the difference between the $pH_1$ and the $pH_2$ to not less than two, the volatile acid (c) is capable of improving the dispersibility of the metal oxide (a). In addition, when the laminated porous film is used as the separator for the battery, the laminated porous film including the coating layer containing the volatile acid (c) which has volatilized has the effect of displaying a preferable peeling strength without deteriorating the properties of the battery.

In the present invention, the pH ($pH_1$) of the coating solution is set to favorably 1 to 5 and more favorably 2 to 4.5. By setting the $pH_1$ to not less than 1, it is possible to sufficiently restrain the acid from corroding a coating machine, which is preferable. On the other hand, by setting the $pH_1$ to not more than 5, it is possible to improve the dispersibility of the metal oxide (a) and thereby sufficiently secure the stability of the coating solution and allow the laminated porous film to have a satisfactory peeling strength.

Although the pH ($pH_2$) of the coating layer (layer II) to be formed by drying the coating solution is not specifically limited, the $pH_2$ thereof is set to favorably 5 to 8, more favorably 6 to 7.5, and most favorably in the vicinity of 7 which is the neutral value of pH. By setting the $pH_2$ to the predetermined range, the volatile acid (c) volatilizes. Thus in the case where the laminated porous film is used as the separator for the battery, the laminated porous film including the coating layer containing the volatile acid (c) which has volatilized has the effect of displaying a preferable peeling strength without deteriorating the properties of the battery.

<Method of Producing Coating Layer (Layer II)>

The laminated porous film of the present invention is produced as follows: The coating layer (layer II) is formed on the porous resin film (layer I) by applying the coating solution containing the metal oxide (a), the resin binder (b) and the volatile acid (c) to at least one surface of the porous resin film and drying the coating solution.

As a method of dissolving or dispersing the metal oxide (a), the resin binder (b), and the volatile acid (c) with the dispersion medium, it is possible to exemplify a mechanical stirring method to be carried out by using a ball mill, a bead mill, a planetary ball mill, a vibration ball mill, a sand mill, a colloid mill, an attritor, a roll mill, a high-speed impeller dispersion, a disperser, a homogenizer, a high-speed impact mill, ultrasonic dispersion, and a stirring blade.

The process of applying the coating solution to the surface of the porous resin film (layer I) is not limited to a specific one. The coating solution may be applied to the surface thereof after extrusion molding finishes, after the length-direction stretching step finishes or after the width-direction stretching step finishes.

The coating solution application manner to be adopted in the above-described coating solution application step is not specifically limited, provided that adopted manners allow a layer to have a necessary thickness and a necessary coating solution application area. Examples of the coating solution application manner include a gravure coating method, a small-diameter gravure coating method, a reverse roll coating method, a transfer roll coating method, a kiss coating method, a dip coating method, a knife coating method, an air doctor coating method, a blade coating method, a rod coating method, a squeeze coating method, a cast coating method, a die coating method, a screen printing method, and a spray applying method. The coating solution may be applied to one surface of the porous resin film (layer I) or to both surfaces thereof according to uses.

The method of removing the dispersion medium is not limited to a specific one, provided that adopted methods do not adversely affect the properties of the porous resin film (layer I). Examples of the method of removing the dispersion medium include a method of drying the dispersion medium at temperatures not more than its melting point with the porous resin film (layer I) being fixed, a method of drying the dispersion medium at a low temperature and a reduced pressure, and a method of immersing the dispersion medium in a poor solvent for the resin binder to coagulate the resin binder and at the same time extract the solvent.

(Configuration and Property of Laminated Porous Film)

The entire thickness of the laminated porous film of the present invention composed of the layer I consisting of the porous resin film and the layer II consisting of the coating layer is set to favorably 5 to 100 μm. The thickness thereof is set to more favorably 8 to 50 μm and most favorably 10 to 30 μm. When the thickness thereof is not less than 5 μm in using the laminated porous film used as the separator for the battery, it is possible to obtain substantially necessary electrical insulating properties. For example, even though a great force is applied to projected portions of electrodes, the projected portions are unlikely to cut through the separator for the battery and thus a short circuit is unlikely to occur. Thus the laminated porous film having a thickness in the above-described range is excellent in safety. When the thickness of the laminated porous film is not more than 100 μm, it is possible to decrease the electric resistance thereof and thus sufficiently secure the performance of the battery.

From the standpoint of the heat resistance of the coating layer (layer II), the thickness thereof is set to not less than 0.5 μm, favorably not less than 1 μm, more favorably not less than 2 μm, and especially favorably not less than 3 μm. On the other hand, regarding the upper limit of the thickness of the coating layer, the thickness thereof is set to not more than 90 μm, favorably not more than 50 μm, more favorably not more than 30 μm, and especially favorably not more than 10 μm from the standpoint of the intercommunicable property of the laminated porous film.

The porosity of the laminated porous film of the present invention including the coating layer (layer II) is set to favorably not less than 30%, more favorably not less than 35%, and most favorably not less than 40%. When the porosity of the laminated porous film is not less than 30%, it secures the intercommunicable property and is excellent in its air-permeable property.

On the other hand, regarding the upper limit of the porosity of the laminated porous film, the porosity thereof is set to favorably not more than 70%, more favorably not more than 65%, and most favorably not more than 60%. When the porosity thereof is not more than 70%, it is possible to sufficiently hold the strength of the laminated porous film, which is preferable from the standpoint of the handleability thereof. The porosity thereof is measured by using the method described in the examples of the present invention.

The air permeability of the laminated porous film of the present invention containing the coating layer (layer II) is set to favorably not more than 2000 seconds/100 ml, more favorably 10 to 1000 seconds/100 ml, and most favorably 50 to 800 seconds/100 ml. When the air permeability of the laminated porous film is not more than 2000 seconds/100 ml, the laminated porous film has intercommunicable property and hence an excellent air-permeable performance, which is preferable.

The air permeability means the degree of difficulty in pass-through of air in the thickness direction of the film and is expressed by seconds it takes for air having a volume of 100 ml to pass through the film. Therefore the smaller a numerical value is, the more easily the air passes through the film. On the other hand, the larger the numerical value is, the more difficultly the air passes therethrough. That is, the smaller the numerical value is, the higher is intercommunicable property in the thickness direction of the film. The larger is the numerical value, the lower is the intercommunicable property in the thickness direction thereof. The intercommunicable property means the degree of connection among pores in the thickness direction of the film. When the laminated porous film has a low air permeability, it is applicable to various uses. For example, when the laminated porous film having a low air permeability is used as the separator for the battery, lithium ions are capable of moving easily, and thus the battery has an excellent performance, which is preferable.

It is preferable that the laminated porous film of the present invention containing the coating layer (layer II) has the SD property when it is used as the separator for the battery. Specifically, after the laminated porous film is heated at 135° C. for five seconds, the air permeability thereof is set to favorably not less than 10000 seconds/100 ml, more favorably not less than 25000 seconds/100 ml, and most favorably not less than 50000 seconds/100 ml. By setting the air permeability of the laminated porous film after it is heated at 135° C. for five seconds to not less than 10000 seconds/100 ml, pores close rapidly when heat is abnormally generated, and electric current is shut off. Thereby it is possible to prevent the occurrence of troubles of the battery such as rupture.

The contraction coefficient of the laminated porous film of the present invention containing the coating layer (layer II) at 150° C. is set to favorably less than 20%, more favorably less than 15%, and most favorably less than 10%. In the case where the contraction coefficient of the laminated porous film at 150° C. is less than 20%, even though the temperature of the battery rises over the SD temperature and abnormal heat is generated, the laminated porous film has a favorable dimensional stability and is heat-resistant. Thus it is possible to prevent the laminated porous film from being broken and improve an internal short-circuit temperature. Although the lower limit of the contraction coefficient of the laminated porous film is not limited to a specific rate, the contraction coefficient thereof is set to preferably not less than 0%.

When the longitudinal direction of the laminated porous film of the present invention is called the "length direction", and the direction vertical to the longitudinal direction is called the "width direction", it is especially preferable to set the contraction coefficient thereof in the length direction and the width direction to less than 10% because the laminated porous film of the present invention has a high heat resistance when the contraction coefficient thereof is in this range.

It is favorable to set the peel-off strength between the porous resin film (layer I) of the laminated porous film of the present invention and the coating layer (layer II) thereof to not less than 1N/15 mm and more favorable to set the peel-off strength therebetween to not less than 2N/15 mm. When the peel-off strength therebetween is not less than 1N/15 mm, it is possible to significantly reduce the possibility of the fall-off of the metal oxide (a) from the coating layer, which is preferable. Although the upper limit of the peel-off strength therebetween is not specifically limited, it is preferable to set the peel-off strength therebetween to not more than 100N/15 mm.

It is preferable that the coating layer (layer II) of the laminated porous film of the present invention contains a metal salt compound (d) resulting from a reaction between an impurity metal contained in the metal oxide (a) and the volatile acid (c). As one main cause the adhesion and dispersibility of the metal oxide (a) in the coating solution deteriorate, the presence of the impurity metal contained in the metal oxide (a) is estimated. In the case where the impurity metal dissolves in the coating solution by the addition of the volatile acid (c) thereto and the resulting metal salt compound (d) is contained in the coating layer (layer II), it is possible to discriminate whether the impurity metal has been removed.

Examples of the impurity metal contained in the metal oxide (a) include potassium, magnesium, and calcium.

As examples of the metal salt compound (d) resulting from the reaction between the impurity metal and the volatile acid (c), it is possible to list sodium chloride, magnesium chloride, and calcium chloride when hydrochloric acid is used as the volatile acid (c). The metal salt compound (d) to be used may vary in dependence on the combination of the volatile acid (c) and the impurity metal.

Whether the coating layer (layer II) contains the metal salt compound (d) resulting from the reaction between the impurity metal contained in the metal oxide (a) and the volatile acid (c) can be determined based on the amount of the metal salt compound (d) measured by using various known analyzing methods for identifying the metal salt compound (d).

Battery

The nonaqueous electrolytic solution secondary battery accommodating the laminated porous film of the present invention as the separator thereof is described below with reference to FIG. 1.

Both a positive electrode plate 21 and a negative electrode plate 22 are spirally wound in such a way that the positive electrode plate 21 and the negative electrode plate 22 are overlapped each other via a separator 10. The outer side of the positive electrode plate 21 and that of the negative electrode plate 22 are fixed with a tape to hold the wound the positive electrode plate 21, negative electrode plate 22, and separator 10 together as a unit.

The unit composed of the positive electrode plate 21, separator 10, and negative electrode plate 22 wound together is accommodated inside a bottomed cylindrical battery case and welded to a positive lead 24 and a negative lead 25. Thereafter the electrolyte is injected into a battery can. After the electrolyte penetrates into the separator 10 sufficiently, the periphery of the opening of the battery can is sealed with a positive lid 27 via a gasket 26. Thereafter preparatory charge and aging are carried out to produce a cylindrical nonaqueous electrolytic solution secondary battery 20.

The electrolytic solution is formed by dissolving a lithium salt in an organic solvent. Although the organic solvent is not limited to a specific kind, esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxofuran; and sulfolane are listed. These organic solvents can be used singly or in combination of not less than two kinds thereof. It is preferable to use an electrolyte in which 1.0 mol/L of lithium phosphate hexafluoride ($LiPF_6$) is dissolved in a solvent containing two parts by mass of the methyl ethyl carbonate mixed with one part by mass of the ethylene carbonate.

As the negative electrode, an alkali metal or a compound, containing the alkali metal, which is integrated with a current collector such as a net made of stainless steel is used. As the alkali metal, lithium, sodium or potassium is used. As the compound containing the alkali metal, alloys of the alkali metal and aluminum, lead, indium, potassium, cadmium, tin or magnesium; compounds of the alkali metal and a carbon material; and compounds of the alkali metal having a low electric potential and metal oxides or sulfides are listed. In using the carbon material for the negative electrode, it is possible to use carbon materials capable of doping or de-doping lithium ions. For example, it is possible to use graphite, pyrolytically decomposed carbons, cokes, glassy carbons, calcined organic polymeric compounds, mesocarbon microbeads, carbon fibers, and activated carbon.

A negative electrode plate produced as follows is used as the negative electrode in this embodiment. A carbon material having an average particle diameter of 10 μm is mixed with a solution in which polyvinylidene fluoride is dissolved in N-methylpyrrolidone to obtain a slurry. After the slurry, consisting of the mixture of the above-described substances, which forms the negative electrode is passed through a 70-mesh net to remove large particles, the slurry is uniformly applied to both surfaces of a negative electrode current collector consisting of a belt-shaped copper foil having a thickness of 18 μm and is dried. After the slurry is compression-molded by a roll press machine, the molding is cut to obtain the belt-shaped negative electrode plate.

A metal oxide such as lithium cobalt oxide, lithium nickel oxide, lithium manganese oxide, manganese dioxide, vanadium pentoxide or chromium oxide and a metal sulfide such as molybdenum disulfide is used as the active substance of the positive electrode. A conductive assistant and a binding agent such as polytetrafluoroethylene are appropriately added to the positive active substance to obtain a combination of these substances. Thereafter the combination of these substances is processed into a molding by using a current collector such as stainless steel net as the core of the positive electrode.

In this embodiment, as the positive electrode, a belt-shaped positive electrode plate produced as described below is used. That is, as a conductive assistant, scaly graphite is added to the lithium cobalt oxide ($LiCoO_2$) at a mass ratio of the lithium cobalt oxide:the scaly graphite=90:5. Both substances are mixed with each other to form a mixture. The mixture and a solution in which the polyvinylidene fluoride is dissolved in the N-methylpyrrolidone are mixed with each other to obtain a slurry. After the slurry, consisting of the mixture of these substances, which forms the positive electrode is passed through the 70-mesh net to remove large particles, the slurry is uniformly applied to both surfaces of a positive current collector consisting of an aluminum foil having a thickness of 20 μm and dried. After the slurry is compression-molded with by roll press machine, the molding is cut to obtain the belt-shaped positive electrode plate.

EXAMPLES

Examples and comparison examples are shown below. Although the laminated porous film of the present invention is described in detail below, the present invention is not limited thereto. The longitudinal direction of the laminated porous film is called the "length direction", and the direction vertical to the longitudinal direction is called the "width direction".

[Content Rate of Metal Oxide (a)]

The rate of the metal oxide (a) is the content rate thereof for the total of the amount of the metal oxide (a) and that of the resin binder (b) in the coating solution.

[Fraction of Solid Content]

The fraction of the solid content is set as the ratio of the total of the amount of the metal oxide (a) and that of the resin binder (b) to 100 mass % of the coating solution.

[pH ($ph_1$) of Coating Solution]

To determine the pH of the coating solution, after a droplet of the coating solution was dripped to pH test paper, the color thereof was checked at 0.5 intervals.

[pH ($ph_2$) of Coating Layer (Layer II)]

To determine the pH of the coating layer (layer II), after a droplet of ion exchange water was dripped to the pH test paper and the pH test paper was rubbed against the coating layer (layer II). The color thereof was checked at 0.5 intervals.

[Total Thickness]

The total thickness of each laminated porous film was computed by taking an average value of in-plane thicknesses thereof measured at unspecified five points with a dial gauge of 1/1000 mm.

[Thickness of Coating Layer (Layer II)]

The thickness of the coating layer (layer II) is computed as the difference between the total thickness of the laminated porous film after the coating solution is applied thereto and the thickness of the porous resin film (layer I).

[Air Permeability (Gurley Value)]

The air permeability (second/100 ml) of each laminated porous film was measured in accordance with JIS P8117.

[Peel-Off Strength]

Figure 3:
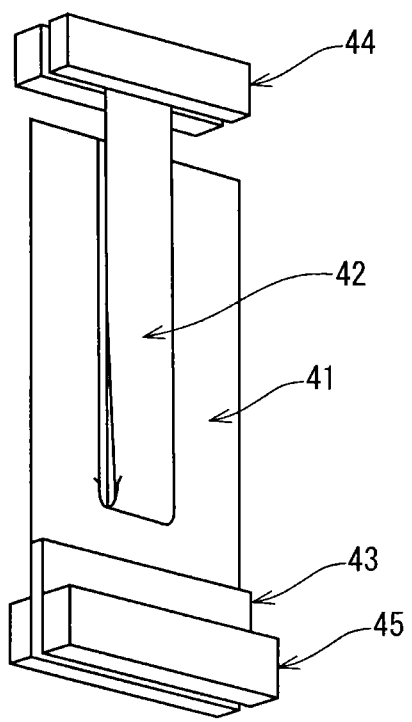
FIG. 3 explains a method of measuring a peel-off strength.

In accordance with JIS Z0237, the peel-off strength between the porous resin film (layer I) and the coating layer (layer II) was measured. Initially a sample cut out in the dimension of 50 mm wide and 150 mm long from each laminated porous film. After a cellophane tape (JIS 21522 produced by Nichiban Co., Ltd.) was applied to the sample as a tape 43 in the length direction thereof, the tape 43 was folded back by 180° in such a way that the back surfaces of the tape overlapped each other, the tape 43 was peeled from the sample by 25 mm. One end of the peeled portion of the sample was fixed to a lower chuck of a tensile testing machine (INTESCO IM-20ST produced by INTESCO Co., Ltd.), and the tape was fixed to an upper chuck. The peel-off strength was measured at a test speed of 300 mm/minute (FIG. 3). After the measurement finished, the measured value of the first 25 mm of the sample was ignored. An average of values of the peel-off strength measured on a length of 50 mm peeled from the specimen was set as the peel-off strength.

[Binding Property]

The binding property was evaluated by the following evaluation criterion:

○: Peel-off strength was not less than 2N/15 mm.

Δ: Peel-off strength was not less than 1N/15 mm and less than 2N/15 mm.

×: Peel-off strength was less than 1N/15 mm.

[Coating Performance]

The performance of coating the surface of the porous resin film was evaluated by the following evaluation criterion:

○: The surface of the porous resin film could be coated. A preferable coating film was formed without aggregation of particles in visible observation.

Δ: The surface of the porous resin film could be coated. Aggregation of a small amount of particles could be recognized in visible observation.

×: Aggregation of a large amount of particles could be recognized. Thus it was difficult to coat the surface of the porous resin film.

[Contraction Coefficient at 150° C.]

After a mark was put on each sample cut out in the dimension of 150×10 mm from the laminated porous film in such a way that the interval between chucks was 100 mm, the sample was put in an oven (Tabai gear oven "GPH200" produced by Tabai Espec Corporation) whose temperature was set to 150° C. and left to stand for one hour. After the sample was taken out of the oven and cooled, the length thereof was measured. The contraction coefficient of each sample was computed by using the following equation:

Contraction coefficient (%)={(100−length after heating)/100}×100

The length of each sample was measured in the length and width directions thereof.

[Heat Resistance]

The heat resistance of each sample was evaluated by the following evaluation criterion:

○: The contraction coefficient at 150° C. was less than 10% in the length and width directions thereof.

Δ: The contraction coefficient at 150° C. was not less than 10% and less than 20% in the length and width directions thereof.

×: The contraction coefficient at 150° C. was not less than 20% in the length and width directions thereof.

[Measurement of Differential Scanning Calorimetry (DSC)]

By using a differential scanning calorimeter (DSC-7) produced by PerkinElmer Inc., each of the obtained laminated porous films was heated from 25° C. up to 240° C. at a scanning speed of 10° C./minute and allowed to stand for one minute. Thereafter the laminated porous films were cooled from 240° C. down to 25° C. at the scanning speed of 10° C./minute and allowed to stand for one minute. Thereafter the laminated porous films were heated again from 25° C. up to 240° C. at the scanning speed of 10° C./minute. When the laminated porous films were heated again, whether the β crystal activity was present or not was evaluated based on the following criterion according to whether a peak was detected in the range of 145° C. to 160° C. which is the crystal melting peak temperature (Tmβ) derived from the β crystal of the polypropylene resin.

○: Samples in which Tmβ was detected in the range of 145° C. to 160° C. (sample had β crystal activity).

×: Samples in which Tmβ was not detected in the range of 145° C. to 160° C. (sample did not have β crystal activity).

The β crystal activity of each sample having a weight of 10 mg was measured in a nitrogen atmosphere.

[Wide-Angle X-Ray Diffraction Measurement (XRD)]

Figure 2:
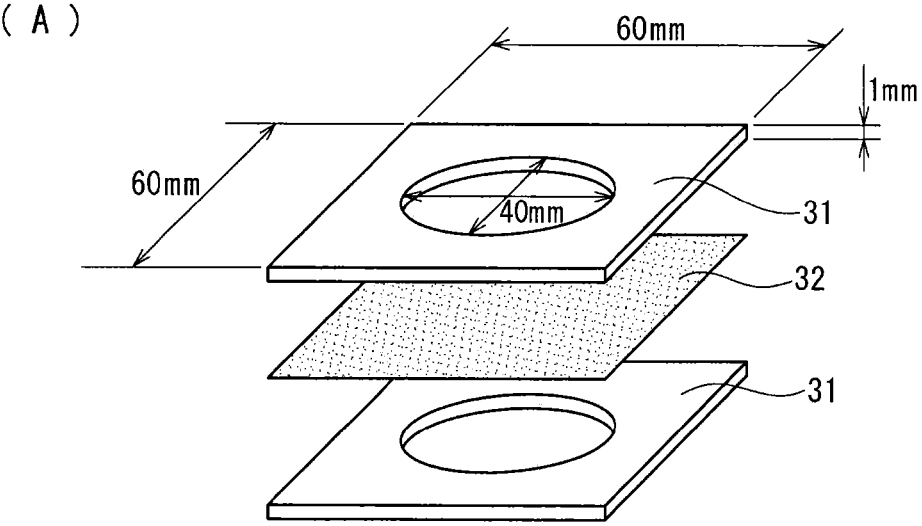
FIG. 2 explains a method of fixing the laminated porous film in a wide-angle X-ray diffraction measurement.
Figure 2:
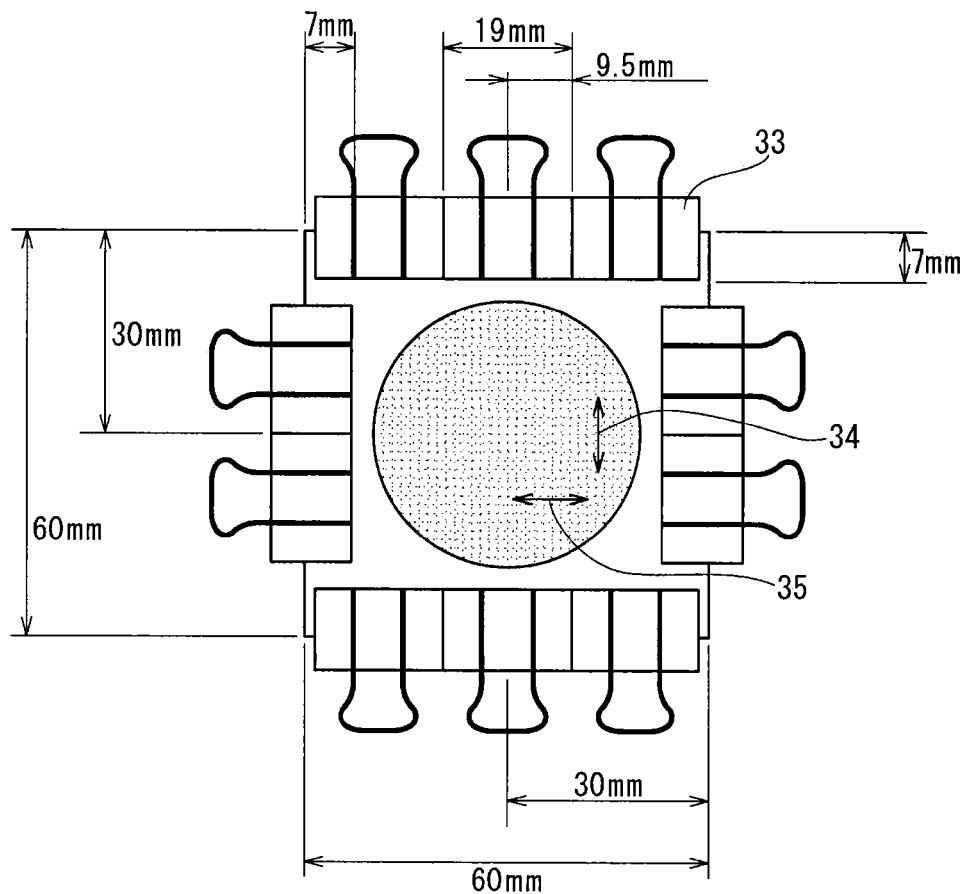

Each of the laminated porous films was cut square in the dimension of 60 mm long and 60 mm wide. As shown in FIG. 2(A), each laminated porous film was sandwiched between two aluminum plates (material: JIS A5052, size: 60 mm in its length direction, 60 mm in its width direction, and 1 mm in its thickness) where a circular hole having a diameter of φ40 mm was formed at its central portion. As shown in 2(B), the peripheries of the aluminum plates were fixed with clips.

Each sample in which the laminated porous film was fixed to the two aluminum plates was put in a blow isothermal instrument (Model: DKN602 produced by Yamato Science Corporation) having a set temperature of 180° C. and a display temperature of 180° C. After each sample was allowed to stand therein for three minutes, the set temperature was altered to 100° C. Thereafter the sample was gradually cooled for not less than 10 minutes to cool it to 100° C. When the display temperature became 100° C., the sample was taken out of the blow isothermal instrument. The sample was cooled for five minutes in an atmosphere having a temperature of 25° C. with the sample being fixed to the two aluminum plates. Thereafter wide-angle X-ray diffraction measurement was carried out on the circular central portion, of the sample, having the diameter of φ40 mm in the following measuring conditions.

Wide-angle X-ray diffraction measuring apparatus: Model Number: XMP18A produced by Mac science Co., Ltd.
X-ray source: CuK α-ray, output: 40 kV, 200 mA
Scanning method: 2θ/θ scan, 2θ range: 5° to 25°, scanning interval: 0.05°, scanning speed: 5°/minute Obtained diffraction profiles were checked to evaluate whether the β crystal activity was present according to whether a peak derived from the (300) surface of the β crystal of the polypropylene resin was detected in the range of 2θ=16.0° to 16.5°.

○: Samples in which the peak was detected in the range of 2θ=16.0° to 16.5° (sample had β crystal activity)

×: Samples in which the peak was not detected in the range of 2θ=16.0° to 16.5° (sample did not have β crystal activity)

In the case where the laminated porous film cannot be cut in the dimension of 60 mm long and 60 mm wide, samples may be prepared by placing the laminated porous film at the circular hole, having the diameter of φ40 mm, which is disposed at the central portion of the aluminum plate.

[Whether Metal Salt Compound (d) was Contained in Coating Layer (Layer II)]

The metal salt compound contained in the coating layer (layer II) was identified by using an ion chromatographic method. Evaluation was made based on the following criterion.

○: Coating layers which contained the metal salt compound (d) derived from the volatile acid (c).

Δ: Coating layers which contained the metal salt compound derived from an unvolatile acid.

×: Coating layers which did not contain the metal salt compound.

[Porous Resin Film (Layer I)]

The porous resin film (layer I) was composed of a layer A consisting of polypropylene resin and a layer B consisting of a mixed resin composition. The outer layers were composed of the layer A, whereas the intermediate layer was composed of the layer B to prepare the porous resin film having a layer construction of the layer A/the layer B/the layer A.

As a layer A, polypropylene resin (Prime Polypro "F300SV" produced by Prime Polymer Co., Ltd., density: 0.90 g/cm$^3$, MFR: 3.0 g/10 minutes) was prepared. As a β crystal nucleating agent, 3,9-bis[4-(N-cyclohexylcarbamoyl)phenyl]-2,4,8,10-tetraoxaspiro[5.5]undecane was prepared. 0.2 parts by mass of the β crystal nucleating agent and 100 parts by mass of the polypropylene resin were blended with each other. The above-described components were supplied to a co-rotation twin screw extruder (produced by Toshiba Machine Co., Ltd., diameter: 40 mmφ, L/D: 32). After the components were fused and mixed with each other at a set temperature of 300° C., a strand was cooled and solidified in a water tank. Thereafter the strand was cut with a pelletizer to produce a pellet of the polypropylene resin. The β crystal activity of the polypropylene resin composition was 80%.

Thereafter as a mixed resin composition composing a layer B, 0.04 parts by mass of glycerol monoester and 10 parts by mass of microcrystalline wax ("Hi-Mic 1080" produced by Nippon Seiro Co., Ltd.) were added to 100 parts by mass of high-density polyethylene (Novatec HD HF560 produced by Japan Polyethylene Corporation, density: 0.963 g/cm$^3$, MFR: 7.0 g/10 minutes). The above-described components were fused and kneaded at 220° C. by using the co-rotation twin screw extruder to obtain a pelletized resin composition.

The above-described two kinds of the materials were extruded from mouthpieces for lamination molding through a feed block for forming a two-kind three-layer structure by using different extruders in such a way that the outer layers of a laminated membrane material to be obtained consisted of the layer A and the intermediate layer thereof consisted of the layer B. Thereafter the materials were cooled to solidify them by using a casting roll having a temperature of 124° C. In this manner, the laminated membrane material having the two-kind three-layer structure consisting of the layer A/the layer B/the layer A was produced.

The laminated membrane material was stretched 4.6 times longer than its original length in the length direction by using a lengthwise stretching machine. After the laminated membrane material was stretched two times longer than its original length at 100° C. in the width direction by using a widthwise stretching machine, the laminated membrane material was subjected to heat fixation/relaxation treatment and corona surface treatment. Thereby a porous resin film (layer I) was obtained.

Example 1

In preparing the coating solution, 19.7 parts by mass of alumina (LS-235C produced by Nippon Light Metal Company, Ltd., average particle diameter: 0.5 μm) and 0.3 parts by mass of polyvinyl alcohol (PVA124 produced by Kuraray Co., Ltd., saponification degree: 98.0 to 99.0, average degree of polymerization: 2400) were dispersed in 80.0 parts by mass of water. Thereafter 0.07 mass % of hydrochloric acid was added to 100 mass % of the obtained coating solution. At that time, the fraction of the solid content contained in the coating solution was 20 mass %, and the pH (pH$_1$) of the coating solution was 4.

After the obtained coating solution was applied to the porous resin film (layer I) by using a bar coater having a coating weight of #20, the coating solution was dried at 60° C. for two minutes.

The properties of the obtained laminated porous film were evaluated. The results are shown in table 1.

Example 2

Except that 0.2 mass % of acetic acid was added to 100 mass % of a coating solution as the volatile acid (c) instead of hydrochloric acid, the coating solution was prepared in a manner similar to that of the example 1. At that time, the fraction of the solid content in the coating solution was 20%, and the pH (pH$_1$) of the coating solution was 4.5.

After the obtained coating solution was applied to the porous resin film (layer I) by using the bar coater having the coating weight of #20, the coating solution was dried at 60° C. for two minutes.

The properties of the obtained laminated porous film were evaluated. The results are shown in table 1.

Comparison Example 1

19.7 parts by mass of alumina (LS-235C produced by Nippon Light Metal Company, Ltd., average particle diameter: 0.5 μm) and 0.3 parts by mass of polyvinyl alcohol (PVA124 produced by Kuraray Co., Ltd., saponification degree: 98.0 to 99.0, average degree of polymerization: 2400) were dispersed in 80.0 parts by mass of water to prepare a coating solution. At that time, the fraction of the solid content in the coating solution was 20%, and the pH ($pH_1$) of the coating solution was 7.5.

After the obtained coating solution was applied to the porous resin film (layer I) by using the bar coater having the coating weight of #20, the coating solution was dried at 60° C. for two minutes.

The properties of the obtained laminated porous film were evaluated. The results are shown in table 1.

Comparison Example 2

Except that 0.035 mass % of the hydrochloric acid was added to 100 mass % of a coating solution as the volatile acid (c), the coating solution was prepared in a manner similar to that of the example 1. At that time, the fraction of the solid content in the coating solution was 20%, and the pH ($pH_1$) of the coating solution was 5.5.

After the obtained coating solution was applied to the porous resin film (layer I) by using the bar coater having the coating weight of #20, the coating solution was dried at 60° C. for two minutes.

The properties of the obtained laminated porous film were evaluated. The results are shown in table 1.

Comparison Example 3

Except that 0.07 mass % of sulfuric acid which is a nonvolatile acid was added to 100 mass % of a coating solution instead of the hydrochloric acid, the coating solution was prepared in a manner similar to that of the example 1. At that time, the fraction of the solid content in the coating solution was 20%, and the pH ($pH_1$) of the coating solution was 4.

After the obtained coating solution was applied to the porous resin film (layer I) by using the bar coater having the coating weight of #20, the coating solution was dried at 60° C. for two minutes.

The properties of the obtained laminated porous film were evaluated. The results are shown in table 1.

Comparison Example 4

Except that 0.2 mass % of polyacrylic acid (molecular weight: 800,000) which is a nonvolatile acid was added to 100 mass % of a coating solution instead of the hydrochloric acid, the coating solution was prepared in a manner similar to that of the example 1. At that time, the fraction of the solid content in the coating solution was 20%, and the pH ($pH_1$) of the coating solution was 5.5.

After the obtained coating solution was applied to the porous resin film (layer I) by using the bar coater having the coating weight of #20, the coating solution was dried at 60° C. for two minutes.

The properties of the obtained laminated porous film were evaluated. The results are shown in table 1.

Comparison Example 5

The properties of the obtained porous resin film (layer I) were evaluated. The results are shown in table 1.

TABLE 1

| | | Example 1 | Example 2 | Comparison example 1 | Comparison example 2 | Comparison example 3 | Comparison example 4 | Comparison example 5 |
|---|---|---|---|---|---|---|---|---|
| Content rate of metal oxide (a) | % | 98.5 | 98.5 | 98.5 | 98.5 | 98.5 | 98.5 | — |
| Added acid | — | Hydrochloric acid | Acetic acid | — | Hydrochloric acid | Sulfuric acid | Polyacrylic acid | — |
| pH ($pH_1$) of coating solution | — | 4.0 | 4.5 | 7.5 | 5.5 | 4.0 | 5.5 | — |
| pH ($pH_2$) of coating layer (layer II) | — | 7.0 | 7.0 | 7.5 | 7.0 | 4.0 | 7.0 | — |
| Difference between $pH_1$ and $pH_2$ | — | 3.0 | 2.5 | 0 | 1.5 | 0 | 1.5 | — |
| Total thickness | μm | 26.8 | 25.0 | 25.6 | 30.8 | 30.1 | 28.9 | 21.0 |
| Thickness of coating layer (layer II) | μm | 5.8 | 4.0 | 4.6 | 9.8 | 9.1 | 7.9 | — |
| Permeability | Second/100 mL | 547 | 552 | 556 | 535 | 697 | 742 | 508 |
| Peel-off strength | N/15 mm | 3.2 | 2.6 | 2.5 | 2.3 | 3.2 | 2.7 | — |
| Binding performance | — | ○ | ○ | ○ | ○ | ○ | ○ | — |
| Coating performance | — | ○ | ○ | X | Δ | X | X | — |
| Contraction coefficient at 150° C. | Length direction % | 4 | 4 | 12 | 18 | 29 | 28 | 25 |
| | Width direction % | 1 | 1 | 4 | 6 | 18 | 20 | 26 |
| Heat resistance | — | ○ | ○ | Δ | Δ | X | X | X |
| DSC | — | ○ | ○ | ○ | ○ | ○ | ○ | ○ |
| XRD | — | ○ | ○ | ○ | ○ | ○ | ○ | ○ |
| Whether metal salt compound (d) was contained | — | ○ | ○ | X | ○ | Δ | Δ | X |

As shown in table 1, the laminated porous films obtained in the examples 1 and 2 had excellent binding property, heat resistance, and air permeability.

On the other hand, in the laminated porous film obtained in the comparison example 1, because the volatile acid (c) was not added to the coating solution, there was no difference between the $pH_1$ and the $pH_2$ unlike the laminated porous film of the example 1. Therefore alumina agglomerated and thus the structure of the laminated porous film was ununiform. In addition, the laminated porous film was insufficient in its heat resistance.

In the laminated porous film obtained in the comparison example 2, although hydrochloric acid was added to the coating solution as the volatile acid (c), the amount of the hydrochloric acid used was small. Therefore unlike the laminated porous film of the example 1, there was a small difference between the $pH_1$ and the $pH_2$. As a result, the coating solution did not have preferable dispersibility and thereby the structure of the laminated porous film was ununiform. In addition, the laminated porous film was insufficient in its heat resistance.

In the laminated porous film obtained in the comparison example 3, although the $pH_1$ was equal to that of the example 1, there was no difference between the $pH_1$ and the $pH_2$ because the nonvolatile acid was used. Therefore the structure of the laminated porous film became ununiform in the drying process. In addition, the laminated porous film was insufficient in its heat resistance.

In the laminated porous film obtained in the comparison example 4, because the polyacrylic acid which is the nonvolatile acid and has a high molecular weight was used, the pH did not decrease sufficiently with a decrease of the acidity of the carboxylic acid and thus there was a small difference between the $pH_1$ and the $pH_2$. As a result, the aggregate of alumina was formed in the coating solution. Therefore the coating solution had low coating performance, and thus the laminated porous film was insufficient in its heat resistance.

Because the coating layer (layer II) was not laminated on the porous resin film (layer I) of the comparison example 5, the laminated porous film had insufficient heat resistance.

INDUSTRIAL APPLICABILITY

The method of the present invention of producing the laminated porous film is applicable to various uses which require air-permeable property. The method of producing the laminated porous film can be very preferably utilized as a material for the separator of a battery; materials for hygienic products such as disposable diaper, body fluid absorbing pats such as sanitary products, a bed sheet, and the like; materials for medical supplies such as surgical gown, a base material for stupe, and the like; materials for clothing items such as jumper, sportswear, rain wear, and the like; building materials such as wallpaper, a roof-waterproofing material, a heat insulation material, a sound-absorbing material, and the like; a material for a container of a desiccant; a material for a container of a moisture agent; a material for a container of a deoxidizer; a material for a pocket warmer; and a material for a package of packing foods to keep them fresh, and a material for a package of packing foods.

EXPLANATION OF REFERENCE SYMBOLS AND NUMERALS

- 10: separator for battery
- 20: secondary battery
- 21: positive electrode plate
- 22: negative electrode plate
- 24: positive lead
- 25: negative lead
- 26: gasket
- 27: positive lid
- 31: aluminum plate
- 32: porous film
- 33: clip
- 34: length direction of porous film
- 35: width direction of porous film
- 41: sample
- 42: tape
- 43: non-slip strip
- 44: upper chuck
- 45: lower chuck

The invention claimed is:

1. A method of producing a laminated porous film comprising a porous coating layer formed on a porous resin film consisting of a single layer or a laminate of a plurality of layers by applying a coating solution containing a metal oxide, a resin binder, and a volatile acid to at least one outer surface of said porous resin film and drying said coating solution to obtain a dried coating layer on at least one outer surface of said porous resin film, wherein:
a pH ($pH_1$) of said coating solution is so adjusted that a difference between said pH ($pH_1$) of said coating solution and a pH ($pH_2$) of said dried coating layer is not less than 2, determining $pH_2$ is carried out by dripping a droplet of ion exchange water on a pH test paper, rubbing the pH test paper against the dried coating layer, and analyzing the pH test paper to determine $pH_2$.

2. The method of producing a laminated porous film according to claim 1, wherein at least one layer of said porous resin film is a porous polyolefin resin film.

3. The method of producing a laminated porous film according to claim 2, wherein said porous polyolefin resin film has a β crystal activity.

4. The method of producing a laminated porous film according to claim 1, wherein said $pH_1$ of said coating solution is set to pH 1 to pH 5.

5. The method of producing a laminated porous film according to claim 1, wherein said $pH_2$ of said dried coating layer is set to pH 5 to pH 8.

6. The method of producing a laminated porous film according to claim 1, wherein a boiling point of said volatile acid or a decomposition temperature thereof is −100° C. to 150° C.

7. The method of producing a laminated porous film according to claim 1, wherein said volatile acid comprises at least one acid selected from the group consisting of carbonic acid, formic acid, acetic acid, propionic acid, acrylic acid, nitric acid, nitrous acid, a halogen oxoacid, hydrosulfuric acid, sulfurous acid, and hydrohalogenic acid.

8. The method of producing a laminated porous film according to claim 1, wherein said volatile acid is present in said coating solution at 0.001 to 1 mass % based on 100 mass % of said coating solution.

9. The method of producing a laminated porous film according to claim 1, wherein said metal oxide is alumina.

10. The method of producing a laminated porous film according to claim 1, wherein the metal oxide is present as particles having an average particle diameter of 0.1 μm to 3.0 μm.

11. The method of producing a laminated porous film according to claim 1, wherein said resin binder comprises at least one member selected from the group consisting of polyether, polyamide, polyimide, polyamide imide, polyaramid, polyoxyethylene, polyvinyl alcohol, cyanoethyl polyvinyl alcohol, polyvinyl pyrrolidone, polyacrylonitrile, polytetrafluoroethylene, polyvinylidene fluoride, polyvinylidene fluoride-hexafluoropropylene, polyvinylidene fluoride-trichloroethylene, polymethyl methacrylate, polyacrylamide, polyvinyl acetate, ethylene vinyl acetate copolymer, poly(4-methyl-1-pentene), cyanoethyl cellulose, a polyacrylic acid derivative, a polymethacrylic acid derivative, and a maleic acid-modified polyolefin.

12. The method of producing a laminated porous film according to claim 1, wherein components present in said coating solution are dispersed with a dispersion medium comprising water as a main component thereof.

13. The method of producing a laminated porous film according to claim 1, wherein a pH of said coating solution is adjusted by selection of said volatile acid and a mixing ratio thereof.

* * * * *